(12) United States Patent
Langsdorf et al.

(10) Patent No.: US 6,299,715 B1
(45) Date of Patent: Oct. 9, 2001

(54) URETHANE ADHESIVE-LAMINATED CARPETING

(75) Inventors: Leah J. Langsdorf, Akron, OH (US); Jeffrey L. Robbins, Phoenixville, PA (US); Ulrich B. Holeschovsky, Chester Springs, PA (US); Harry Stefanou, Strafford, PA (US); Barry V. Evangelist, Berwyn, PA (US); Robert D. Duffy, West Chester, PA (US); Gary L. Allen, Winfield, WV (US)

(73) Assignee: Bayer Antwerp N.V. (BE)

(*) Notice: Subject to any disclaimer, the term of this patent is extended or adjusted under 35 U.S.C. 154(b) by 0 days.

(21) Appl. No.: 09/115,024

(22) Filed: Jul. 14, 1998

(51) Int. Cl.[7] .............................. B32B 27/40; B32B 27/12
(52) U.S. Cl. ..................... 156/72; 156/331.4; 156/331.7; 428/97
(58) Field of Search .................. 156/72, 435, 331.4, 156/331.7; 428/96, 97

(56) References Cited

U.S. PATENT DOCUMENTS

| | | | |
|---|---|---|---|
| 4,595,445 | * | 6/1986 | Hombach et al. ................ 156/307.3 |
| 4,696,849 | | 9/1987 | Mobley et al. . |
| 4,853,054 | | 8/1989 | Turner et al. . |
| 4,853,280 | | 8/1989 | Poteet . |
| 5,158,922 | | 10/1992 | Hinney et al. . |
| 5,462,766 | | 10/1995 | Markusch et al. . |
| 5,482,908 | | 1/1996 | Le-Khac . |
| 5,604,267 | | 2/1997 | Duffy . |
| 5,612,113 | * | 3/1997 | Irwin, Sr. ............................... 428/95 |
| 5,646,195 | | 7/1997 | Mobley . |

FOREIGN PATENT DOCUMENTS 0 268 875  6/1988 (EP) .
1 380 910  1/1975 (GB) .

OTHER PUBLICATIONS

ASTM D–2849–69, Standard Methods of Testing of Urethane Foam Polyol Raw Materials, pp. 913–931.
ASTM D–1355–67, Standard Test Method for Tuft Bind of Pile Floor Coverings, pp. 345–347.
ASTM D–412–92, Standard Test Methods for Vulcanized Rubber and Thermoplastic Rubbers and Thermoplastic Elastomers—Tension, pp. 1–13.

* cited by examiner

Primary Examiner—Sam Chuan Yao
(74) Attorney, Agent, or Firm—Brooks & Kushman P.C.

(57) ABSTRACT

Laminated carpeting consisting of a secondary backing adhered to a greige good of yarn tufted into a primary backing are prepared from polyurethane adhesives by single puddle processes which allow for lowered use of polyurethane while producing carpets exhibiting excellent delamination strength. Preferably, a reactive polyurethane system is employed as a primary adhesive, and the secondary backing is skip-coated with a minor amount of a non-advancing skip coat.

15 Claims, 3 Drawing Sheets

URETHANE ADHESIVE-LAMINATED CARPETING

TECHNOLOGICAL FIELD

The present invention pertains to carpet manufacture. More particularly, the present invention pertains to improved methods for adhering secondary backing to tufted carpeting employing polyurethane adhesive systems.

DESCRIPTION OF THE RELATED ART

Laminated carpets are produced by tufting carpet yarns into a primary backing, which is then coated with adhesive and secured to a secondary backing, generally of polypropylene or jute. A key property of the laminate produced by this process is delamination strength, the force required to separate the secondary backing from the carpet. In order to achieve suitable delamination strength, the secondary backing must be in intimate contact with the tufted yarn/primary backing ("greige good") during the curing process, and a sufficient amount of adhesive which ensures complete wet out of the tufted fibers and secondary backing must be used. In addition to delamination strength, the tuft bind, which measures the force necessary to pull the tufted yarn from the carpet, is also important.

In the past, SBR latex has been almost exclusively used as the laminating adhesive. The latex may be applied by numerous methods, such as the indirect applicator (pan application) which is now used infrequently, and "direct" methods, these involving roll over flatbed or roll over roll processes, either as a single unitary process, or in series as a tandem process. Regardless of the actual method used, the reverse of the greige good is coated with a precoat of adhesive, and the secondary backing, also coated with adhesive, is married to the greige good, and cured.

While SBR latex has been the adhesive of choice, carpet prepared from SBR latex also exhibits numerous deficiencies. For example, the tensile strength and hydrolytic stability of SBR latexes is less than desired, and SBR polymers are less durable than desired. Greige goods in which SBR latexes are used as tuft bind adhesives also are subject to "rewicking". Moreover, use of SBR latexes requires the evaporation of large quantities of water during cure, a process which is energy intensive. Polyurethane adhesives are capable of forming a laminate with superior delamination strength as well as other desirable physical properties. However, technical problems have prevented widespread use of polyurethanes despite the increased performance potential.

Substitution of reactive polyurethane systems for latex laminating adhesives has not been straight forward, and has required numerous process modifications. For example, conventional latex maintains its tackiness and viscosity during processing, even in the curing oven. Following application of latex adhesive, the back-side of the greige goods is faced downward. A coat of additional latex is applied to the secondary backing by a skip roll. As a result of the latex properties, good temporary adherence of the secondary backing to the greige goods is obtained. In the curing oven, the latex viscosity does not drop significantly as water evaporates. Thus, the secondary backing satisfactorily adheres to the greige goods, and little dripping of latex from the bottom of the laminate into the oven is observed.

With polyurethanes, however, the single adhesive application common with latex has not been found operable. Due to its limited pot life, polyurethane adhesive cannot be applied from troughs which are common with latex systems, but rather must be applied from a "puddle" which accumulates before the upstream edge of the doctor blade. Polyurethane froth adhesives are also not as inherently tacky as SBR latex. Following application of polyurethane adhesive to the greige good and the working of the adhesive into the tufts by means of a closely spaced doctor bar or similar device, a considerable additional amount of polyurethane must be applied from a second puddle in order to provide enough adhesive to temporarily adhere the secondary backing. Even with this additional adhesive, the slow advancement of the adhesive and its low level of tack does not allow for the desired adherence between the greige goods and secondary backing.

In the curing oven, polyurethanes generally exhibit a considerable initial decrease in viscosity prior to cure. As a result, unless the carpet laminating line is run with the greige goods reverse side uppermost, considerable loss of polyurethane into the curing oven would occur. Moreover, if sufficient initial adherence of secondary backing to the greige good has not been obtained, separation of the secondary backing may occur during this period of low viscosity.

Increasing the viscosity of the polyurethane adhesive would assist in ameliorating some of the foregoing problems. However, the increased viscosity will detract from the ability of the adhesive to be forced into the tufts and to wet out the fibers. Tuft bind will thereby be compromised. Catalyzing the cure of the adhesive would enable viscosity to increase. However, some portion of the now-curing polyurethane will begin to gel and cure on the doctor blade and in portions of the puddle. These cured and partially cured portions of polyurethane will have to be removed, generally while the line is operating, a procedure which is not desirable from a safety standpoint. In current polyurethane carpet laminating adhesive processes, therefore, heat activated (latent) catalysts are used. Even with these catalysts, some system advancement which requires removal of cured polyurethane from the puddle occurs. Due to the inability to increase viscosity, delayed cure systems again lack sufficient tack to firmly adhere the secondary backing, requiring a second adhesive puddle.

For the same reasons that actively catalyzed polyurethanes cannot be used in the polyurethane adhesive puddles, skip coats of catalyzed polyurethane have not been practiced as well. Advancement of the reacting polyurethane in a skip coat trough would not only alter the applied skip coat weight over time, but moreover, the polyurethane in the trough would eventually set up, halting the process.

Commercial polyurethane laminating systems have thus far employed two puddle systems. In some such systems, two puddles are employed prior to cure. In one commercial system, two puddles are used with the first puddle used exclusively as a tuft bind adhesive which is oven cured, the second puddle then supplying a secondary backing adhesive which is also cured. None of these systems have met with overwhelming commercial success, and the majority of carpet laminates continue to be latex based.

It would be desirable to provide a polyurethane carpet laminating process which requires but a single puddle, yet which allows for acceptable tuft bind as well as satisfactory delamination strength. It would be further desirable to provide a polyurethane laminating system which does not require excessive amounts of polyurethane to provide sufficient delamination strength. It would be yet further desirable to provide a polyurethane laminating system which does not require a second oven for curing.

SUMMARY OF THE INVENTION

The present invention pertains to a polyurethane carpet laminating system which requires the use of but a single polyurethane adhesive puddle. The carpet laminates produced by the subject process exhibit acceptable tuft bind and initial secondary backing adhesion without the use of large amounts of applied polyurethane supplied by a second puddle. The lower amount of polyurethane employed markedly decreases the weight of the carpet and decreases raw material cost at the same time.

DESCRIPTION OF THE PREFERRED EMBODIMENTS

The various embodiments of the subject invention may best be understood following a description of the drawings, which have been simplified for ease of understanding. The embodiments of the subject invention share the common benefit of but a single necessary polyurethane puddle.

Figure 1:
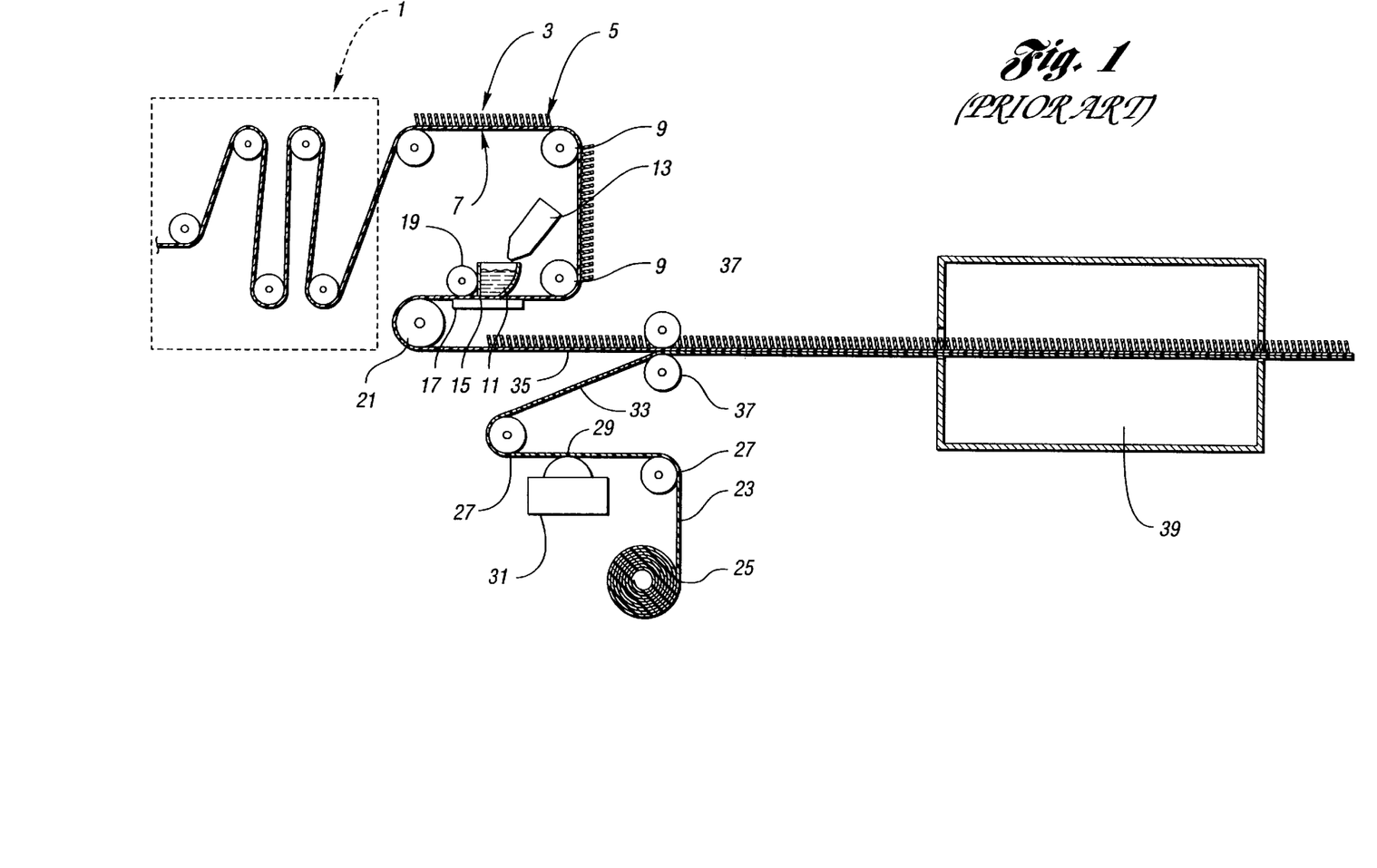
FIG. 1 illustrates a typical latex-based carpet laminating process.

FIG. 1 illustrates a typical commercial latex-based carpet laminating process. In the dashed box labeled 1, preliminary carpet operations such as correction of bowing and skewing, which do not form a part of the laminating process per se, are practiced. The greige good 3, with carpet exterior 5 uppermost and the reverse side 7 to which tuft bind adhesive must be applied lowermost, is redirected by means of rollers 9 to place the reverse side of the greige goods under trough 11, which is supplied with latex adhesive through supply line 13. The downstream edge 15 of trough 11 serves as a doctor blade or gauge bar which, in conjunction with platen 17, adjusts the amount of latex applied, and assists also in forcing the latex into the tuft ends. Further impregnation is provided by pressure roller 19. The carpet is then redirected by roller 21. Secondary backing 23 is supplied from supply roll 25 and directed by rollers 27 across skip roll 29, which rotates in trough 31 filled with additional latex. Skip roll 29 and trough 31 together comprise a "skip coater". The skip coated secondary backing 33 is pressed onto the latex adhesive-coated greige goods 35 by their travel through marriage rolls 37. The carpet then passes through curing oven 39 where water is removed from the latex, and the latex cures, adhering tufts and secondary backing to form a laminated carpet.

Figure 2:
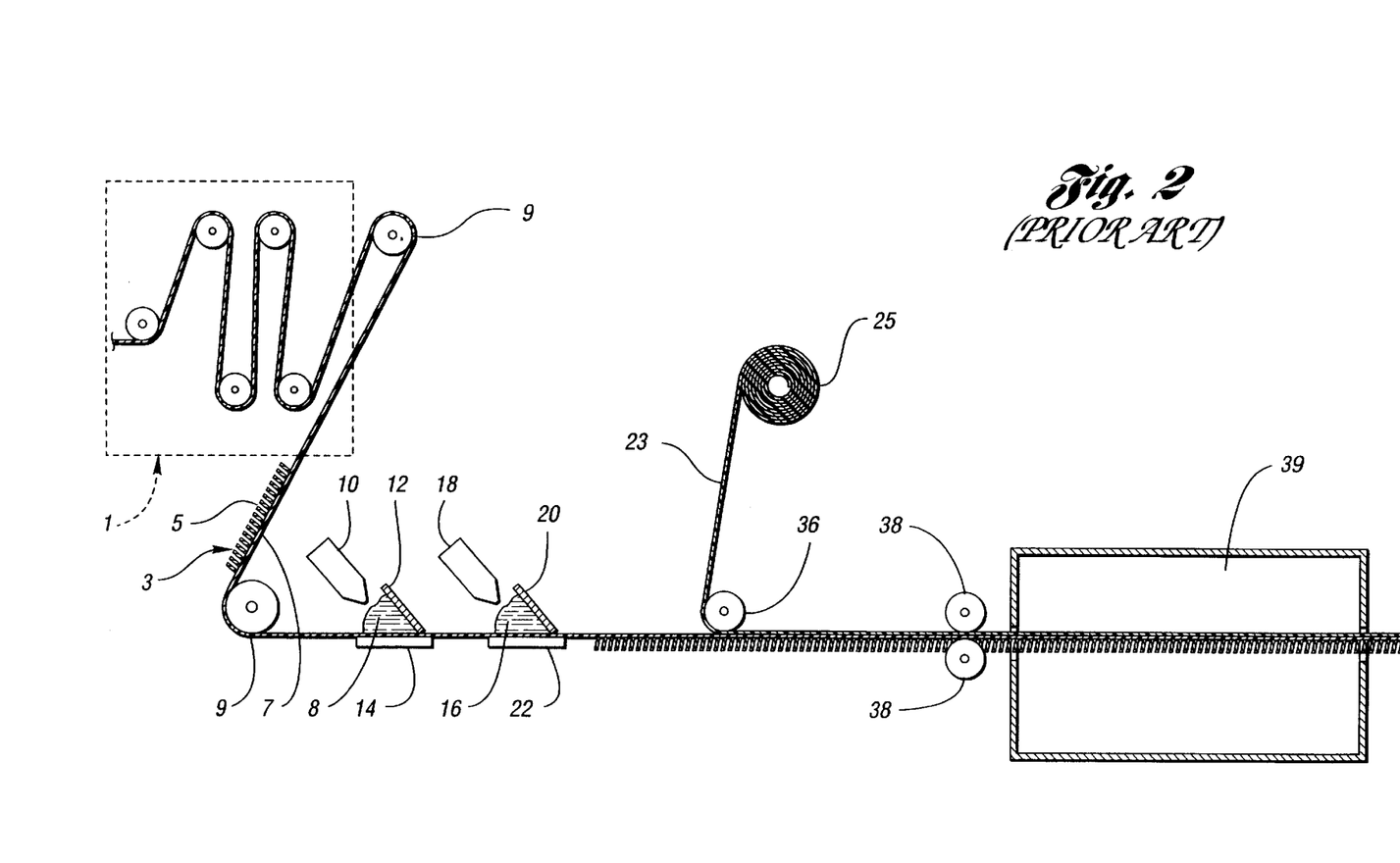
FIG. 2 illustrates a two puddle polyurethane-based carpet laminating system.

FIG. 2 illustrates a commercial two puddle polyurethane system. Dashed box 1 provides the same carpet preparation activities as in FIG. 1. To the reverse side 7 of the greige goods, polyurethane is applied from puddle 8, supplied with polyurethane froth adhesive through supply line 10. Doctor blade 12, in cooperation with platen 14, limits the applied weight of polyurethane and forces it into the greige goods. The "puddle" collects prior to the doctor blade. Following the first puddle 8 is second polyurethane adhesive puddle 16, supplied with frothed polyurethane adhesive from supply line 18. Doctor blade 20, in conjunction with platen 22, adjusts the thickness of the deposited adhesive. While the first doctor blade 12 substantially contacts the reverse of the greige good, the second doctor blade is spaced a distance away to allow enough adhesive to be deposited to temporarily (prior to cure) bind the secondary backing. The secondary backing 23, supplied from supply roll 25, contacts the adhesive-coated greige good below roller 36. Prior to entry into the curing oven, press rollers 38 assist in maintaining stable contact between the secondary backing and the greige goods. Curing the laminate is accomplished by curing oven 39.

Figures 3, 3A, 3B:
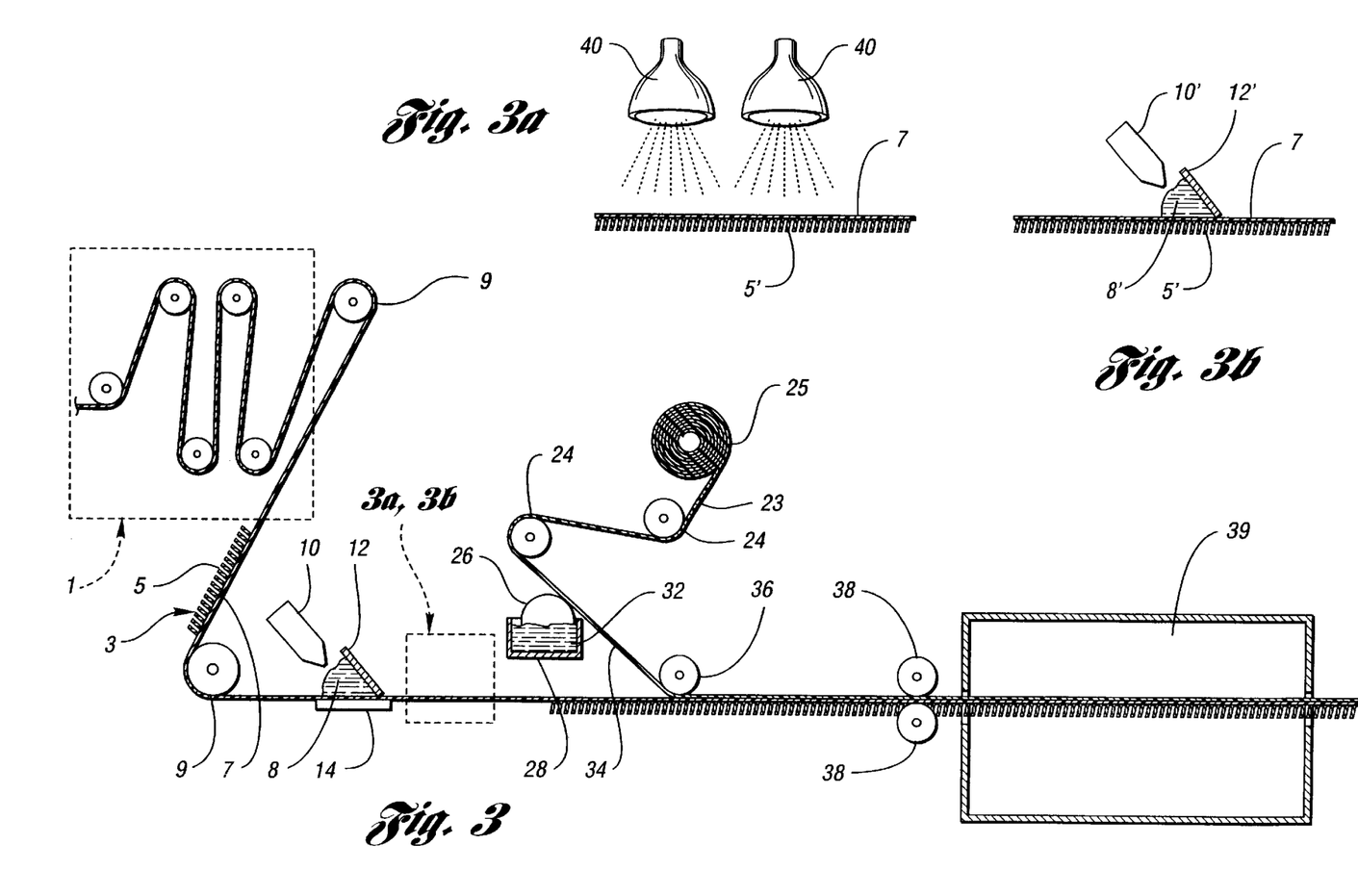
FIG. 3 illustrates one embodiment of the subject invention.
FIG. 3a illustrates the optional use of the infrared heat source in one embodiment of the subject process.
FIG. 3b illustrates use of an optional auxiliary puddle in one embodiment of the subject invention.

FIG. 3 illustrates the process of the subject invention. A portion of the process is similar to the two puddle system of FIG. 2, however, the second puddle has been eliminated, and a skip coater, in one embodiment, supplies a non-advancing skip coat as described hereinafter. In the latter embodiment of the subject invention, following application of adhesive from puddle 8 and its impregnation onto and into the reverse of the greige good between doctor blade 12 and platen 14, the reverse of the carpet is contacted with a skip-coated secondary backing. The secondary backing 23, supplied from supply roll 25, is directed by rollers 24 past skip roll 26 which rotates in trough 28 filled with skip coating composition 32. Rotation of skip roll 26 in the trough coats the skip roll with skip coating composition 32 which is then transferred to the secondary backing 23 to form a skip-coated secondary backing 34. Skip-coated secondary backing 34 mates with the polyurethane adhesive coated greige good below roller 36, which may be supplemental with a roller directly below, or a platen, to form a pair of marriage rollers or equivalent devices. The laminate then passes between rollers 38 into oven 39 for curing.

The skip coating, or other equivalent coating, of the secondary backing with the skip coating composition (as hereinafter defined), is a necessary element of the majority of the embodiments of the subject invention, and an optional element for the remaining embodiments. Only one puddle (puddle 8) is necessary in these processes.

In dashed box 3a,3b are further optional elements which may be employed in the single puddle carpet laminating process. In FIG. 3a is shown an optional heating means, which may comprise a bank of infrared heating lamps 40, as shown, or which may comprise equivalent devices which accelerate the cure of the deposited polyurethane adhesive to viscosity the latter and render it tacky to achieve good initial adhesion of a secondary backing, whether skip-coated or free of skip coat. For example, equivalent viscosifying means comprise hot air, whether dry or moist, microwave or RF energy, electron beam or UV laser activation, etc. As a result of the increased temperature or electromagnetic energy, the temperature or radiation sensitive latent catalyst will cause the polyurethane adhesive to begin to cure, as a result of which the viscosity will increase and the adhesive will become tacky. Secondary backing can then be pressed against the curing adhesive to form a firm initial bond which will develop full strength in the curing oven. By this embodiment, the polyurethane adhesive supplied by supply pipe 10 can be of relatively low viscosity to encourage good tuft bind, yet be of higher viscosity and tack by the time the greige good is married with the secondary backing. The viscosifying means of this embodiment of the invention can be used alone, i.e. without a skip-coated secondary backing or a second adhesive application, or may be used in conjunction with other aspects of the invention.

In FIG. 3b is illustrated an auxiliary puddle 8', supplied with urethane adhesive by supply pipe 10', the quantity deposited determined by doctor blade or gauge bar 12'. While only a single puddle is a required element of the subject invention, a second puddle can be employed without departing from the spirit of the invention, which is to ensure firm initial contact of secondary backing with adhesive-coated greige good and achievement of good delamination strength in the cured product. For example, a second puddle may be used to deposit some additional amount of adhesive. However, the amount deposited will be less than that required to provide the adhesion of the secondary backing in the absence of use of the optional viscosifying means illustrated by FIG. 3a and in the absence of a skip-coated secondary backing. Thus, the carpet will remain relatively light as compared to the weight of the carpet produced employing a two puddle system. The second puddle could, for example, supply a minor amount of a more viscous and tacky urethane composition. Such a composition can be more viscous than the polyurethane applied from the first puddle as it does not have to provide the function of tuft binding. Alternatively, a first, higher density puddle may be used in conjunction with a second more highly frothed puddle which may, in certain circumstances, provide higher tuft bind and delamination strength. However, without use of a skip-coated secondary backing, or alternatively further viscosifying by a viscosifying means, a second urethane application will still be insufficient to guarantee adequate secondary backing adhesion unless large amounts of polyurethane are used.

In all of the foregoing embodiments, the Figures have been simplified for ease of viewing and understanding. In commercial embodiments, various tension controlling devices, tenter frames, drive motors, etc., will be required, as is well known to those skilled in the art. Depending upon the adhesive viscosities, weight pickup desired, depth of tufting through the primary backing, and other well known factors, additional coating stations or additional doctor blades, nip rolls, impregnation rollers, and the like may be required for any particular application. Design and fabrication of such devices is within the skill of the art.

When a reactive polyurethane system is desired, as in the polyurethane puddles, conventional di- and polyisocyanates and polyurethane polyols, catalysts, additives, and auxiliaries are generally used. Examples of suitable preferred isocyanates are toluene diisocyanate (TDI) and methylene diphenylene diisocyanate (MDI), and their mixtures. MDI need not be used in the form of the pure or nearly pure 4,4'-isomer. Modified isocyanates such as urethane- and carbodiimide-modified isocyanates, particularly the former, may be used. Polymeric and crude MDI containing tri- and higher functional isocyanates may be used as well. Isocyanate-terminated prepolymers and quasi-prepolymers are also useful.

The polyols useful are well known and may have average nominal functionalities ranging from about 2 to about 8, preferably in the range of 2 to 3. The polyols may be polytetramethylene ether glycols (PTMEG), hydroxyl-functional polyester polyols, or preferably polyoxypropylene polyols which may be homopolymeric or may be a copolymer containing other copolymerizable monomers such as ethylene oxide, butylene oxide, oxetane, etc. Polyoxyalkylene polyols may be prepared by base catalyzed oxyalkylation of suitably hydric initiator molecules, and may advantageously be low or ultra-low unsaturation polyols having levels of intrinsic unsaturation less than about 0.015 meq/g, preferably lower than 0.010 meq/g, and most preferably with maximum unsaturation in the range of 0.002 to 0.007 meq/g. The polyols may have equivalent weights of from about 300 Da to about 10,000 Da, preferably 1000 Da to 4000 Da, and most preferably in the range of 1500 Da to 2500 Da. The polyoxyalkylene copolymer polyols may be block, random, block-random, or any other configuration. In reactive systems, polyols with high primary hydroxyl content are especially preferred.

Isocyanate-terminated prepolymers useful herein may be prepared by conventional methodology, preferably at somewhat elevated temperature. The free isocyanate content may range from about 1 weight percent or below to about 35 weight percent or higher, more preferably 2 weight percent to about 30 weight percent, yet more preferably 6 weight percent to about 25 weight percent, and most preferably in the range of 8 weight percent to about 20 weight percent. The polyol component used to prepare the prepolymers may be one of the polyols previously described, or a lower molecular weight glycol or oligomeric glycol or polyol.

For the reactive polyurethanes destined for use in puddles to supply polyurethane adhesive to the greige good, a catalyst which is effective to cure the adhesive in the curing oven is necessary. However, the catalyst must not cause undue advancement of the adhesive in the puddle. For this reason, all but the most minor amounts of highly active urethane catalysts such as the various tin compounds and tertiary amines, are generally avoided. However, such catalysts may be used in conjunction with delaying compounds such as those disclosed in U.S. Pat. No. 3,635,906, herein incorporated by reference. Latent catalysts which activate at elevated temperatures, i.e., iron diacetylacetonate and nickel diacetylacetonate, are preferred. The amounts of such catalysts used should be an effective amount, i.e., an amount which provides for substantially full cure in the curing oven while exhibiting minimum advancement in the puddle. The greige good adhesive may also include photoactivated catalysts when radiation such as electron beam, U.V., etc., are used to hasten local advancement in optional embodiments herein.

Thus, the present invention pertains to methods for increasing the initial adherence of secondary backing to polyurethane adhesive-coated greige goods without resort to the required use of a double puddle system which together deposits a large areal weight of polyurethane. This object of the present invention may be achieved by viscosifying the initially deposited polyurethane to a tacky state prior to its contact with the secondary tacking; by applying a non-advancing skip coat (as later defined) to the secondary backing prior to its marriage with the polyurethane adhesive-coated greige good; or by a combination of these two adhesion-promoting processes.

The skip coat composition is unique to the present process and may take several distinct forms. Skip coating has been used before in latex adhesive systems, but has not been used in polyurethane systems due to the problem of the polyurethane setting up in the skip roll trough. In the pre sent invention, this problem is circumvented by employing a "non-advancing skip coat." By the term "non-advancing" is meant that the skip coat composition, by itself, exhibits very little increase in viscosity over the life of the composition in the trough, i.e., is not a "self-curing" composition. Compositions within the scope of the invention will not cure until contacted with the polyurethane adhesive coating on the greige good, or upon entry into the curing oven. The skip roll compositions, while in the skip roll trough, will thus exhibit little or no increase in viscosity, the skip coat weight will remain substantially constant, and there will be no need to remove accumulated gel or polymer from the skip coat trough.

The skip coat composition must contain a "polyurethane reactive composition." By "polyurethane reactive composition" is meant a composition which will become part of the overall polyurethane adhesive system by virtue of being a component of that system, by reacting with a component of that system, or by catalyzing reaction of the system. Thus, for example, the skip coat composition may comprise an isocyanate-terminated prepolymer or quasi-prepolymer; or a mixture of polyols, i.e., polyoxyalkylene polyols, polyester polyol, polytetramethylene ether glycols, polycaprolactone diols, and the like; amino-functional polyoxyalkylene polyethers; one or more low molecular weight glycols and/or aminoalcohols; and even in some cases, may be water. When isocyanate-functional components are used in the skip coat, it is preferred that a nitrogen blanket or its equivalent be used to prevent reaction with atmospheric moisture.

The skip coat, composition will also be an "adherence promoting composition." In this sense, the skip coat composition, when applied to the secondary backing, will exhibit greater initial adhesion to the polyurethane adhesive-coated greige good than that obtained by a skip coat-free secondary backing, and greater than that obtained from a skip coat which has the same composition as the greige good polyurethane adhesive when used in the same areal weight as the skip coats of the present invention.

The skip coat composition functions to increase adhesion between the polyurethane adhesive-coated greige good and the secondary backing by providing a skip coat which is itself viscous and tacky, or which promotes rapid and at least local cure of the greige good adhesive such that the latter's viscosity and/or tack is increased. The increase in tack/viscosity encourages initial adhesion of secondary backing to the greige good. Increased initial adhesion in turn promotes superior lamination strength in the cured carpet laminate.

Among the viscous, tacky skip coating compositions, as previously discussed, are isocyanate terminated prepolymers; hydroxyl-, amino-, epoxy-, and other isocyanate-reactive liquid polymers, particularly hydroxyl-functional polyoxyalkylene polyethers and hydroxyl-functional polyester polyols; and lower molecular weight and therefore less viscous varieties of these components to which are added thickeners which render the skip coat composition relatively viscous and tacky. Viscous, tacky skip coating compositions containing blocked isocyanates and isocyanate-reactive ingredients such as polyoxyalkylene polyols may also be used.

The viscous, tacky skip coat compositions may also include a catalyst, provided that the catalyst does not catalyle the advancement of the skip coating composition. For example, a skip coating composition employing isocyanate-terminated polyoxyalkylene polyol-derived prepolymers may include a urethane catalyst, but should not include an isocyanate trimerization catalyst. The former cannot cause substantial advancement of the skip coat composition isocyanate-terminated prepolymer as there is no hydroxyl-functional compound in the skip coat with which to react to form urethane linkages. However, trimerization catalysts are to be avoided as these may catalyze isocyanurate formation from trimerization of the free isocyanate groups of the prepolymer. Viscous polyoxyalkylene polyol or polyester polyol skip coat compositions may include both urethane or isocyanurate catalysts, however.

The skip coating compositions may also comprise relatively low viscosity components which contain active urethane catalysts. For example, the skip coating may comprise one or more relatively low molecular weight and therefore low viscosity alkylene glycols, low molecular weight monomeric or oligomeric polyols, or alkanolamines. Examples include alkylene glycols such as ethylene glycol, diethylene glycol, triethylene glycol, propylene glycol, dipropylene glycol, tripropylene glycol, 1,3-propanediol, 1,4-butanediol, 1,6-hexanediol, 2-methyl-1,3-propanediol and the like; polyols such as glycerol, sorbitol, trimethylolpropane, and their oligomeric oxyalkylation products; and alkanolamines such as mono-, di-, and trialkanolamines. Examples of the latter are monoethanolamine, monopropanolamine, diethanolamine, triethanolamine, and the like. Water may also be used, either alone or in conjunction with other ingredients. Mixtures of low viscosity glycols, polyols, etc., may be used, as may be one or more of these with minor amounts of high molecular weight, viscous polyols and other polymers.

The low viscosity skip coat compositions may be characterized by their general inability, in and of themselves, to provide an increase in adherence of the secondary backing to the greige good from the puddle without reaction with the greige good adhesive. For example, should ethylene glycol be used alone as a low viscosity skip coating, its contact with the reactive polyurethane adhesive of the greige good, containing a low activity or latent catalyst, will not greatly affect the viscosity of the greige good adhesive prior to cure in the curing oven, even when the adhesive is highly over indexed.

To provide the desired viscosity increasing function, low viscosity skip roll compositions must contain functional groups highly reactive with isocyanate groups, e.g., primary amino groups, and/or must contain a highly active catalyst, as opposed to a latent catalyst. Examples of highly active catalysts are those catalysts known to one skilled in the art as highly effective in catalyzing the urethane reaction, for example tin catalysts, particularly tin octoate, dibutyltin diacetate, dibutyltin dilaurate, dimethyltin diacetate, and the like. Tertiary amines are also suitable. For example, a highly effective viscosity-increasing low viscosity skip coat may be formulated from ethylene glycol and dibutyltin dilaurate. Application of only relatively small amounts of such a skip coat to the secondary backing and contact with the adhesive of the greige good will cause rapid advancement, viscosification, and tack development on the adhesive, promoting firm initial adherence of the secondary backing to the greige good.

A further skip coat composition employs a latently reactive polyurethane system containing an isocyanate-reactive component such as a polyoxyalkylene polyether polyol, and a blocked isocyanate. Blocked isocyanates are prepared by reacting an isocyanate or isocyanate-terminated prepolymer with a generally monofunctional isocyanate-reactive molecule which generates a reaction product which decomposes to the original isocyanate upon heating or readily reacts with isocyanate-reactive materials in reactions which may be termed "transurethanation" reactions, analogous to transesterification. Blocked isocyanates are well known to those skilled in the art, and are described, for example, in the treatise by Saunders and Frisch, POLYURETHANES: CHEMISTRY AND TECHNOLOGY. Isocyanates blocked with relatively low molecular weight aliphatic alcohols such as isopropanol are preferred.

Because the isocyanates are blocked, no reaction with the isocyanate-reactive components occurs in the skip trough. The blocked isocyanate-containing compositions provide initial adherence of secondary backing to greige good by being viscous. High viscosity may be achieved by numerous methods well known to those skilled in the art, including selection of viscous isocyanate-reactive components such as high molecular weight polyoxyalkylene polyols, or through the use of thickeners, e.g., inorganic clays, or organic thickeners. During cure, the blocked isocyanates unblock, reacting with available isocyanate-reactive components. Blocked isocyanates may also be used alone, dissolved in suitable solvent or suitably dispersed in nonaqueous dispersing medium, so long as the requisite viscosity and tack are found.

When mixtures of polyol and catalyst are used to coat the secondary backing, the polyol may be one of the polyols previously enumerated, or may be of lower molecular weight, for example one comprising a lower aliphatic glycol such as ethylene glycol, propylene glycol, diethylene glycol, dipropylene glycol, tripropylene glycol, or the like, preferably mixed with a higher molecular weight polyol. The high molecular weight polyol increases the flexibility of the cured adhesive, while the aliphatic glycols may lower the skip coat composition viscosity, which may also be achieved through addition of a non-reactive diluent.

The polyurethane systems employed in puddles as "precoat adhesives" or "greige good adhesives" are preferred to have indices at least near stoichiometric, i.e. in the range of 90–120, but preferably somewhat over indexed. It is preferable that the index exceed 101, and more preferably be in the range of 103 to 120. Under-indexed systems are not preferred, as tuft bind may suffer. Areal weight of the precoat adhesive advantageously ranges from 20 $oz/yd^2$ to 50 $oz/yd^2$, and more preferably 25 $oz/yd^2$ to 40 $oz/yd^2$. However, these amounts are not limiting.

The precoat adhesive to be applied to the greige good preferably contains a relatively high amount of filler, for example amounts of 30 parts by weight to 350 parts by weight relative to the weight of the polyol, more preferably 50 parts by weight to 500 parts by weight. Further details with respect to formulations and mixing methods for froth foam may be had by reference to U.S. Pat. No. 5,604,267 and the references cited therein. Suitable fillers are ground or microcrystalline limestone, dolomite, barite, aluminum hydroxide, and the like.

The skip coat is desirably used in considerably lesser quantities in areal weight relative to the amount of precoat adhesive. For example, with isocyanate-reactive skip coats, the applied skip coat areal weight is preferably 0.05 to 1 $oz/yd^2$ (1.7 to 33 $g/m^2$), more preferably 0.2 to 0.5 $oz/yd^2$ (6.7 to 16.7 $g/m^2$), these quantities, again, not limiting. When isocyanate-functional skip coats are utilized, larger areal weights are tolerable, as any excess isocyanate-functionality left after marriage of greige good and secondary backing and cure between the respective reactive components will further react in the cure oven and/or with atmospheric moisture. In such cases, the preferred range is 0.05 to 2.5 $oz/yd^2$ (1.7 to 83.4 $g/m^2$), more preferably 0.2 to 1.0 $oz/yd^2$ (6.7 to 33 $g/m^2$). Blocked isocyanate skip coats may be used in similar amounts. However, both larger and smaller amounts of all types of skip coats may be used as required by the particular greige good, greige good adhesive, and other raw material process parameters.

When isocyanate-reactive skip coats are used, the skip coat isocyanate-reactive functionality may be of greater reactivity than the isocyanate-reactive functionality of the adhesive. For example, when the adhesive contains a high secondary hydroxyl-functionality polyol, a polyol with considerable primary hydroxyl functionality may be used in the skip coat. In the same manner, if a primary hydroxyl polyol is used in the adhesive, e.g. one with 30% primary hydroxyl groups, a polyol with higher primary hydroxyl content may be used in the skip coat. It is also possible to use amine-terminated polyols, aliphatic glycols, alkanolamines, aliphatic diamines, and the like, as well as water in the skip coat as more reactive isocyanate-reactive compounds. For example, it is possible to utilize mixtures of water and a catalyst, for example an amine catalyst, which facilitates the reaction of water with the isocyanate group. Hydroxyl-, amino-, and both hydroxyl- and amino-functional compounds having molecular weights below about 300 Da may advantageously be used.

Catalyst present in the skip coat should be of sufficient type and amount that relatively rapid cure is achieved following marriage of the greige good and secondary backing. The catalyst may constitute up to 10 weight percent of the skip coat, more preferably 0.5 to 7 weight percent, and most preferably 2 to 6 weight percent.

By the term "skip coat" as used herein is meant a coating applied to the secondary backing in most minor amount relative to the weight of adhesive applied to the greige good. By the term "complimentarily reactive" is meant a skip coat which is reactive with excess unreacted functionality of the adhesive, i.e. has complimentary functionality. For example, in an over-indexed adhesive with excess isocyanate functionality, a complimentarily reactive skip coat will contain isocyanate-reactive functionality. Unless indicated otherwise, the use of "adhesive" in the claims refers to the precoat adhesive applied to the greige good which will subsequently contact the secondary backing. This adhesive may be a liquid, may be a froth foam, or may be a foamable system, unless otherwise limited. Molecular weights and equivalent weights herein are expressed as number average molecular and equivalent weights in Daltons (Da).

The formulations presented herein may also be used in conjunction with additional non-froth adhesives/foam layers. For example, it is possible to apply a tuft bind adhesive, for example a relatively fluid froth or a liquid adhesive of relatively low viscosity to more effectively wet out the tufts in the backing side of the greige good followed by application of a further adhesive as a second layer to the greige good. More than one froth foam may be used similarly, for example froth foams containing differing filler content. In addition to or in lieu of froth foams, foams containing a volatile blowing agent or a reactive blowing agent such as water may be used.

The blocked isocyanates disclosed herein are further suitable for use as greige good adhesives, i.e., as precoat or "tuft bind" adhesives, when used in conjunction with an isocyanate-reactive component such as a polyoxyalkylene podyol or mixture of the latter with chain extenders, etc. Such adhesives may be used in single puddle systems such as those disclosed herein, optionally with skip coated secondary backing, or may be used in two puddle conventional applications, particularly when the viscosity of the second puddle adhesive is increased to allow for increased initial bonding of secondary backing. The blocked isocyanate adhesives can be used without secondary backing as well.

The advantage of blocked isocyanates over other formulations of "reactive" polyurethanes is that the latter, even when employing "latent" cure catalysts, still exhibit slow cure. Such compositions will slowly set-up in a trough, for example, at ambient temperature. Blocked isocyanate compositions, however, tend to be relatively specific with regard to unblocking temperature, and will remain at substantially the same viscosity for considerable periods of time. Such compositions can also be used as a bonding agent or installation adhesive.

A particularly elegant use of blocked isocyanate adhesive formulations is in the preparation of hot molded carpeting.

In such applications, a blocked isocyanate adhesive composition is applied to a carpet and either dried but not cured, or allowed to remain "wet" in the carpet, the wet side and carpet face protected by one or more release films. The carpet containing the blocked isocyanate formulation is placed into a heated mold, for example a contoured mold such as one suitable for manufacturing carpeting contoured for automotive use, and heated until cured, producing a rigid, molded carpet laminate product of the desired contour.

The terms "viscous" and "tacky" are used consistent with what is understood by those skilled in the art. A reactive polyurethane mixture is viscosified when its viscosity is advanced from the viscosity expected of the same system in the absence of heat treatment, additional catalyst, etc. The term "tacky" indicates that the curing polyurethane has reached the stage where it is "sticky", and in the form of a highly viscous liquid, gel, or semi-solid such that a secondary backing will adhere to the curing polyurethane and provide an initial delamination strength which exceeds the delamination strength obtainable using the same process equipment but without first viscosifying and rendering the adhesive tacky.

In the process of the present invention where an over- or under-indexed primary adhesive is used with a complimentarily reactive skip-coated secondary backing, a unique product will be obtained in which the portion of the total polymer adhesive (primary adhesive plus skip coat) exhibits a non-uniform composition, with the portion of adhesive nearest the primary backing having a different NCO/OH (or NCO/NH$_2$ or NH) ratio than the portion adjacent the secondary backing. Since the proportion of reactive groups are different, the resulting cured polymers in these portions will be different as well. Yet despite these differences, the total adhesive will be an integral whole. This unitary structure is different, for example, than structures prepared by foam on foam technology, where distinct foam layers can be readily observed.

A further improvement in adherence, and thus in delamination strength, may be achieved by contacting the secondary backing, prior to application of adhesive or skip coat, with a rough surface which is effective to cause the woven fibers in the backing to "fuzz" or become partially disoriented with respect to the woven backing. The rough surface may, for example, be provided by a stiff brush against which the backing is contacted, a rough surface such as would be provided by abrasive-coated paper or metal, etc. The "hook" surface of hook and loop fastening material, e.g. VELCRO®, may be advantageously used. The rough surface may be stationary or may be mounted on a suitable roller, preferably one which rotates at a different circumferential speed than the rate of backing travel. In place of a rough surface, a needle loom containing a number of barbed needles may enter and be withdrawn from the backing. All these methods are means are herein termed "surface disorienting" methods and means. Other equivalent means of performing surface disorienting will suggest themselves to one skilled in the art. A test of whether sufficient "disorienting" has occurred is to compare the delamination strength of a surface disoriented backing with that of the same backing which has not been so treated.

Having generally described this invention, a further understanding can be obtained by reference to certain specific examples which are provided herein for purposes of illustration only and are not intended to be limiting unless otherwise specified.

In the Examples which follow, a pilot plant finishing line capable of processing three foot (0.9 m) wide greige goods was employed. The frothed polyurethane is applied in a puddle on the back of the greige good. The greige good is tentered to pins on both sides which continually move the greige good through the process. The greige good passes under a doctor bar which evenly distributes the froth to the desired gauge. After a distance of several feet, the secondary backing to which a skip-coat has been applied is then mated with the back of the carpet by means of a marriage roller. Shortly thereafter, the greige good enters an oven heated to about 130° C. The residence time in the oven is about four to five minutes. The urethane is fully cured when exiting the oven. The skip coat is applied by passing over the top of a roller that is dipping into a trough containing the skip-coat as shown in FIG. 3. The rotating speed of the skip-coat application roller is set to a speed equaling about 5–50% of the line speed of the greige good depending on the desired applied weight of the skip coat. Delamination strength was conducted according to ASTM test D 3936-80.

EXAMPLE 1

In this Comparative Example, a polyurethane reactive system was employed as the precoat adhesive, and applied in the conventional manner to the greige good, following which the secondary backing, a 6 pic polypropylene backing, was pressed onto the curing adhesive and cured in a heated oven. The reactive polyurethane system was formulated as follows:

B-Side:
- 88 parts Atlantis Q1000 (ARCO Chemical)
- 12 parts diethylene glycol
- 70 parts calcium carbonate
- 70 parts aluminum hydroxide
- 1.5 parts LC 5615 catalyst (Witco-OSi)
- 1.0 part L 5614 surfactant (Witco-OSi)

A-Side
- 73.4 parts Baytuft 751

The A and B sides were frothed in a Firestone-type mixer at an index of 112 and applied as a froth to the back of the greige good at an areal weight of 38.4 oz/yd$^2$ (1.28 Kg/m$^2$). Delamination strength is presented in Table 1.

EXAMPLE 2

Example 1 was repeated, but the system formulation was applied at 46 oz/yd$^2$ (1.5 Kg/M$^2$)

EXAMPLE 3

In this subject invention example, the polyurethane adhesive was formulated as follows:

B-Side:
- 91 parts Atlantis Q1000
- 9 parts diethylene glycol
- 90 parts calcium carbonate
- 90 parts aluminum hydroxide
- 1.6 parts LC 5615 catalyst A-Side:
- 59.6 parts Baytuft 751

In this case, a skip coat consisting of 95.6 parts of a 6000 Da mw (number average) polyoxypropylene/polyoxyethylene copolymer triol with total oxyethylene content of 20%, 2.0 parts dimethyltin dilaurate catalyst, and 2.4 parts triethylenediamine catalyst was applied to the secondary backing, 11 pic polypropylene, at 0.9 oz/yd$^2$ (30 g/m$^2$). The precoat adhesive was applied as a froth to the greige good at 36.4 oz/yd² (1.2 Kg/m²). The index of the adhesive was 1.05. Results are presented in Table 1.

EXAMPLE 4

Example 3 was repeated at an index of 110, and applied weights of 33.0 oz/yd² (1.1 Kg/m²) and 0.28 oz/yd² (9.3 g/m²) for the adhesive and skip coat, respectfully. Results are presented in Table 1.

EXAMPLE 5

Example 4 is repeated, but the B-side formulation modified to contain 92 parts Atlantis Q1000 and the diethylene glycol replaced by 8 parts 2-methylpropane diol. A 6 pic polypropylene secondary backing is used. Application amounts and results are presented in Table 1.

EXAMPLE 6

Following the procedures of Examples 3–5, on a 6 pic polypropylene backing, the following formulation is applied at an index of 103. The skip coat consists of 95.6 parts of a 2200 Da m.w. polyoxypropylene diol with ethylene oxide content of 25%, 2.0 parts dimethyltin dilaurate, and 2.4 parts triethylene diamine. Application amounts and results may be found in Table 1.

B-Side:
   83.5 parts 2200 DA mw diol, 25% polyoxyethylene cap
   16.5 parts 2-methylpropane diol
   1 part wetting agent
   90 parts calcium carbonate
   90 parts aluminum hydroxide
   1.5 parts LC 5615
The same A-side was used as used previously.

EXAMPLE 7

The same B-side formulation as used in Example 3 is used, in addition containing 0.25 parts LC 5614 surfactant. The A-side (Baytuft 751) was used in an amount of 60.7 parts, at an index of 107. A skip coat is applied to a 6 pic polypropylene secondary backing, the skip coat consisting of 95 parts of a 6000 Da polyoxypropylene triol with 20% oxyethylene group content and 5 parts dibutyltin dilaurate. The amounts and results are presented in Table 1.

TABLE 1

| Examples | Applied Precoat Weight¹, oz/yd² | Applied Skipcoat Weight², oz/yd² | Delamination Strength, lbs/inch |
|---|---|---|---|
| 1 (Comparative) | 38.4 (1.28) | — | 0 |
| 2 (Comparative) | 46 (1.53) | — | 7.9 |
| 3 | 36.4 (1.21) | 0.9 (30) | 7.3 |
| 4 | 33.0 (1.10) | 0.28 (9.3) | 6.7 |
| 5 | 40.5 (1.35) | 0.25 (8.3) | 9.7 |
| 6 | 29.5 (0.98) | 0.24 (8.0) | 3.4 |
| 7 | 37.8 (1.26) | Not determined | 5.6 |

¹Amounts in parentheses in Kg/m²
²Amounts in parentheses in g/m²

The table indicates that the conventional process, where a reactive polyurethane system is applied to the greige good and the secondary backing applied without a reactive skip coat, a coating weight of 38.4 oz/yd² (1.3 Kg/M²) failed to provide any delamination strength. The laminate delaminated freely. Only by applying 46 oz/yd² (1.5 Kg/M²) of adhesive was satisfactory delamination strength obtained. In contrast, using the method of the subject invention, only 29.5 oz/yd² (984 g/m²) of polyurethane, when employed with 0.24 oz/yd² (8.0 g/m²) of skip coat, produced considerable delamination strength. Similarly, Examples 3, 4, and 7 produced delamination strength comparable to that obtained in Example 2 (Comparative), which used considerably more polyurethane, while Example 5 resulted in delamination strength considerably higher, again with less polyurethane usage. These results are particularly surprising in view of the fact that Examples 3–7 contain higher loading of filler, which generally results in lower adhesion due to lower penetration of the froth into the tufts and secondary backing.

EXAMPLE 8

The polyurethane system of Example 1 is used, and no skip coat is applied to the secondary backing. However, prior to marriage of the secondary backing with the coated greige good, the adhesive-coated surface is exposed to infrared heat lamps until the coating viscosities to the point where it is partially cured and tacky. The secondary backing is pressed onto the greige good while the adhesive is tacky, and fully cured in an oven. The secondary backing exhibits considerable delamination strength.

EXAMPLE 9–11

Two blocked isocyanate-type skip coat compositions were formulated. The blocked isocyanate of Example 9 is a blocked isocyanate-terminated prepolymer, while that of Example 10 is a blocked modified MDI. The Example 9 blocked isocyanate composition is prepared by reacting 4.5 parts isopropanol with a solution consisting of 32.3 parts of a 10% NCO-content prepolymer of MONDURT™ CD and ACCLAIM™ polyol 4200 until the NCO content is negligible. To the blocked isocyanate is then added 56.3 parts ARCOL® E-351 polyol and 0.03 to 0.06 parts CosCat 83 catalyst.

The blocked isocyanate of Example 10 is prepared by reacting MONDURT™ CD isocyanate (NCO=29%) with isopropanol (10 parts). The product is a friable solid which is subsequently ground into a fine powder. The powder is dissolved in 14 parts propylene carbonate, to which is then added 55 parts ARCOL® E-351 polyol (ARCO Chemical Co.), and 0.03 to 0.06 parts CosCat 83 catalyst.

Greige good is prepared as in prior examples, employing a precoat (greige good, or tuftbind) adhesive consisting of 92.0 parts ATLANTIST™ Q-1000, 8.0 parts diethylene glycol, 1.0 parts wetting agent, 1.5 parts LC 5615, 90 parts aluminum trihydrate, and 90 parts calcium carbonate as the resin side. The isocyanate is 56.88 parts Baytuft 751, giving an isocyanate index of 102.

The greige good adhesive was applied to the reverse side of 16×15 cm greige good samples and drawn down with a metal blade-type bar. Skip coat was applied at 0.9 oz/yd² to a mylar release coating over which polypropylene secondary backing was contacted and pressed lightly. The "skip-coated" secondary backing was then removed from the release film, placed onto the adhesive-coated greige good, rolled down with a weighted roller, and lightly hand pressed into place. The carpet assemblies were oven cured at 150° C. for 10 minutes, cooled, and physical properties measured. Results are presented in Table 2 below.

TABLE 2

| Example | 9 | 10 | 11 (Comparative) |
|---|---|---|---|
| Skip Coat Wt. (oz/yd$^2$) | 0.9 | 0.9 | -0- |
| Precoat Wt. (Oz/yd$^2$) | 40 | 38 | 36 |
| Delamination Strength (lb/in) | 3.9 | 3.1 | 1.7 |
| Tuft Bind (lb-ft) | 12.9 | 11.5 | 12.2 |

The results presented in Table 2 indicate that the blocked isocyanate formulations of the subject invention are highly effective in increasing delamination strength despite their use in most minor amount (ca. 2.5% by weight relative to precoat weight). Isocyanate—terminated prepolymer-based formulations (Example 9) and modified isocyanate-based formulations (Example 10) were both effective.

By the term "minor" is meant less than 50% relative to the standard of comparison. By the term "most minor" is meant less than 5% relative to the standard of comparison. Any composition or process disclosed and/or claimed herein can be used exclusive of any component not expressly disclosed and/or claimed. By the term "viscosity and/or tack building" is meant a component which accelerates build of viscosity and/or tack.

Having now fully described the invention, it will be apparent to one of ordinary skill in the art that many changes and modifications can be made thereto without departing from the spirit or scope of the invention as set forth herein.

What is claimed is:

1. A process for preparing a laminated carpet by adhesively bonding a secondary backing to a greige good comprising carpet yarns tufted into a primary backing, said process comprising:
    a) applying to the primary backing side of said greige good, a reactive polyurethane adhesive comprising an isocyanate-functional component and an isocyanate-reactive component, to form an adhesive-coated greige good;
    b) prior to contacting said adhesive-coated greige good with said secondary backing, promoting adherence of the secondary backing to the adhesive-coated greige good by applying a non-advancing polyurethane-reactive skip coating composition to said secondary backing;
    c) contacting said secondary backing with the adhesive-coated surface of said greige good to form a laminate; and
    d) curing said reactive polyurethane adhesive to form a laminated carpet,
    wherein said non-advancing polyurethane-reactive skip coat composition, following application to said secondary backing, will exhibit greater adhesion to the polyurethane adhesive-coated greige good than is obtained from the same areal weight of a skip coat having the same composition as said reactive polyurethane adhesive.

2. The process of claim 1 wherein said non-advancing polyurethane reactive skip coating composition comprises one or more isocyanate-terminated prepolymers or quasiprepolymers.

3. The process of claim 2 wherein said composition further includes one or more polyurethane catalysts.

4. The process of claim 1 wherein said non-advancing polyurethane reactive skip coating composition comprises one or more isocyanate-reactive compounds such that the resulting composition is viscous and tacky or viscosity and tack building.

5. The process of claim 1 wherein said non-advancing polyurethane reactive skip coating composition comprises one or more isocyanate-reactive polymers and at least one active polyurethane catalyst.

6. The process of claim 4 wherein at least one of said one or more isocyanate-reactive compounds is an isocyanate-reactive polymer selected from the group consisting of hydroxyl- and amino-functional polyoxyalkylene polyethers, hydroxyl-functional polyester polyols, polytetramethylene ether glycols, and polycaprolactone glycols.

7. The process of claim 4 wherein at least one of said one or more isocyanate-reactive compounds is selected from the group consisting of hydroxyl-functional, amino-functional and both hydroxyl and amino-functional compounds having a molecular weight below about 300 Da.

8. The process of claim 1 wherein said non-advancing polyurethane reactive skip coating composition comprises a low viscosity liquid and at least one active polyurethane catalyst.

9. The process of claim 8 wherein said low viscosity liquid comprises an isocyanate-reactive liquid.

10. The process of claim 1 wherein said non-advancing polyurethane reactive skip coating composition comprises a blocked isocyanate composition.

11. The process of claim 10 wherein said blocked isocyanate composition further comprises at least one isocyanate-reactive component.

12. The process of claim 10 wherein said blocked isocyanate composition further comprises at least one active polyurethane catalyst.

13. The process of claim 1 wherein said skip coating composition is applied to said secondary backing at an areal concentration of about 1.7 g/m$^2$ or more.

14. The process of claim 1 wherein said skip coating composition comprises one or more isocyanate-reactive compounds and an active polyurethane catalyst, and said skip coating composition is applied to said secondary backing at an areal concentration of about 1.7 g/m$^2$ to about 33 g/m$^2$.

15. The process of claim 1 wherein a single polyurethane adhesive puddle is employed in applying said polyurethane adhesive to said greige good.

* * * * *